Nov. 2, 1965 P. A. JOHNSON 3,215,147

MONEY-HANDLING DEVICES

Filed April 3, 1961 7 Sheets-Sheet 1

INVENTOR.
PHILIP A. JOHNSON
BY
Ray Eilers
ATT'Y.

INVENTOR.
PHILIP A. JOHNSON
BY
Roy Eilers
ATT'Y.

INVENTOR.
PHILIP A. JOHNSON
BY
Roy Ellis
ATT'Y.

INVENTOR.
PHILIP A. JOHNSON
BY
Roy Eilers
ATT'Y.

INVENTOR.
PHILIP A. JOHNSON
BY
Roy Eilers
ATT'Y.

Nov. 2, 1965 P. A. JOHNSON 3,215,147

MONEY-HANDLING DEVICES

Filed April 3, 1961 7 Sheets-Sheet 6

INVENTOR.
PHILIP A. JOHNSON
BY
Roy Eilers
ATT'Y.

Nov. 2, 1965 P. A. JOHNSON 3,215,147

MONEY-HANDLING DEVICES

Filed April 3, 1961 7 Sheets-Sheet 7

INVENTOR.
PHILIP A. JOHNSON
BY
Roy Ellis
ATT'Y.

3,215,147
Patented Nov. 2, 1965

3,215,147

MONEY-HANDLING DEVICES

Philip A. Johnson, Olivette, Mo., assignor to National Rejectors, Inc., St. Louis, Mo., a corporation of Missouri Filed Apr. 3, 1961, Ser. No. 100,342
4 Claims. (Cl. 133—2)

Figure 1:
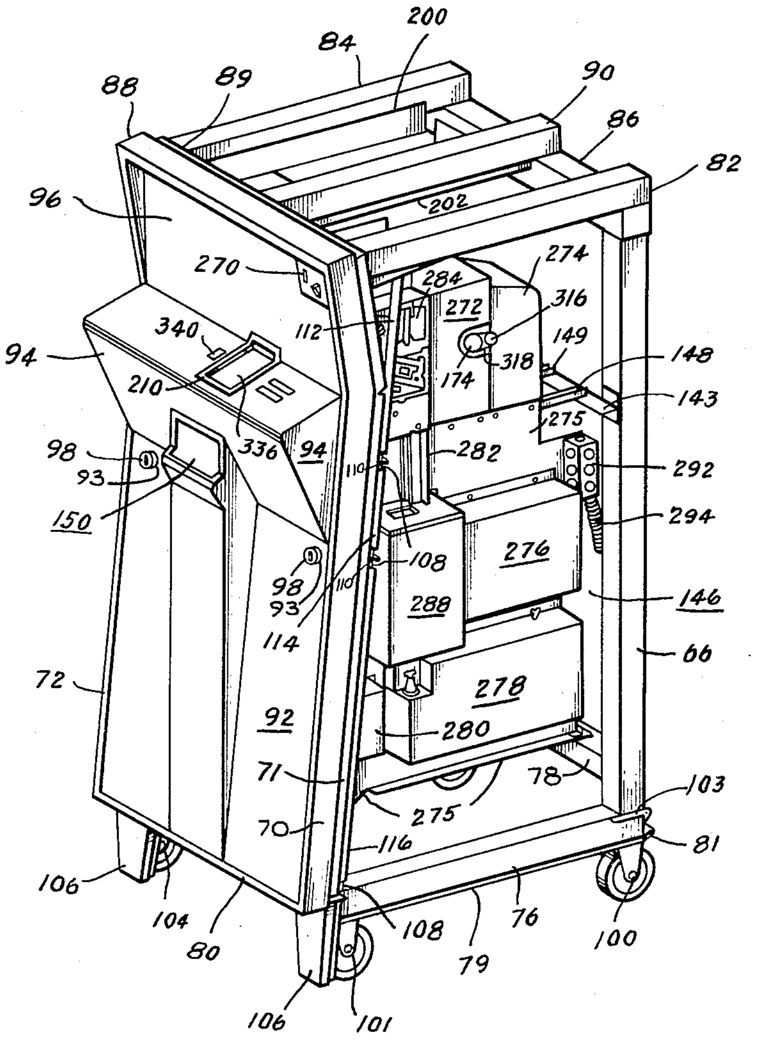

This invention relates to improvements in money-handling devices. More particularly, this invention relates to improvements in housings for money-handling devices.

It is, therefore, an object of the present invention to provide an improved housing for money-handling devices.

It is usually desirable to enclose money-handling devices within housings that prevent access to those money-handling devices by unauthorized persons but that provide ready and full access to those money-handling devices by authorized persons. Where the money-handling devices are small, it is usually easy to enclose them within housings that limit access to those money-handling devices to authorized persons but that provide full and ready access to those devices by such persons. However, where the money-handling devices are large, it is usually difficult to enclose them within housings that limit access to those money-handling devices to authorized persons but that provide full and ready access to those devices by such persons; and this is particularly true where those money-handling devices are money-changing devices. Such money-handling devices must be encased within heavy-walled housings and yet must be opened frequently to enable the supply of change to be replenished. The present invention provides a housing for large change-making devices that limits access to said change-making devices to authorized persons but that can easily be opened to provide full and ready access to those change-making devices. It is, therefore, an object of the present invention to provide a housing for large money-handling devices that limits access to said money-handling devices to authorized persons but that can easily be opened to provide full and ready access to those money-changing devices.

The housing provided by the present invention has one side thereof open and has a removable closure for that one side. The frame of the money-handling device is secured to and supports that removable closure; and when that removable closure is moved away from the open side of the housing, the frame of the money-handling device will move with it and thereby provide full and ready access to that money-handling device. It is, therefore, an object of the present invention to provide a housing which has one side thereof open and which has a removable closure for that one side which is secured to and supported by the frame for the money-handling device which is normally disposed within that housing.

The frame of the money-handling device provided by the present invention is mounted on wheels and thus can readily be moved. Mobility of the frame of the money-handling device is important and desirable, but that mobility must not be permitted to lead to injuries to the money-handling device. Specifically, that mobility must not be permitted to let the money-handling device bump into the sides of the housing or into objects near that housing as that money-handling device is telescoped into or out of that housing. The present invention assures full mobility for the money-handling device, and yet keeps that money-handling device from being injured because of that mobility, by providing the housing for that money-handling device with guide-ways that hold the frame of the money-handling device for movement along a fixed path but that permit free and ready movement of that frame along that path. It is, therefore, an object of the present invention to mount the frame of a money-handling device on wheels and to provide the housing for that money-handling device with guide-ways that hold that frame for movement along a fixed path.

The frame of the money-handling device provided by the present invention is provided with inclined faces that can coact with the guide-ways on the housing to automatically guide the wheels of that frame into those guide-ways. With this arrangement, the money-handling device and the frame therefor can be separated completely from the housing and yet can be readily telescoped back into the housing. It is, therefore, an object of the present invention to provide the frame of a money-handling device with inclined faces that can coact with the guide-ways on the housing for that money-handling device to automatically guide the wheels on that frame into those guide-ways.

Most money-handling devices are equipped with slug rejectors that can reject slugs and that can direct those slugs to a cup-like receptacle that is accessible from the exterior of the housing for the money-handling device. Where the money-handling device pays out change, that money-handling device should direct the change to that same cup-like receptacle, so that a patron need not look to more than one place to recover his money. The housing provided by the present invention can accommodate a money-handling device which pays out both currency and coins as change; and both the currency and the coins will be directed to the same cup-like receptacle. The currency is light in weight and is relatively bulky; and, as a result, that currency could tend to stick in the chute which is intended to direct it to the cup-like receptacle. Any such sticking would be very objectionable because it could keep a patron from receiving the full amount of change due him. The present invention obviates any sticking of the currency to be paid out as change, by mounting the currency-ejecting assembly of the money-handling device directly above the cup-like receptacle so the ejected currency can fall straight down into that cup-like receptacle. Further, the present invention obviates any sticking of the currency to be paid out as change, by mounting the currency-ejecting assembly of the money-handling device an appreciable distance above the cup-like receptacle so that the currency will have appreciable kinetic energy as it reaches and enters that cup-like receptacle. Because of that kinetic energy, the tendency of the currency to stick is reduced; and it is, therefore, an object of the present invention to mount the currency-ejecting assembly of a money-handling device directly above the cup-like receptacle for that device and to mount that currency-ejecting assembly an appreciable distance above that cup-like receptacle.

The present invention additionally obviates sticking of the currency by causing the currency to be paid out before the coins are paid out. Where this is done, the coins are able to apply propelling forces to any currency that tends to stick, and those propelling forces will be great enough to force the currency to move all the way into the cup-like receptacle. It is, therefore, an object of the present invention to provide a money-handling device which pays out both currency and coins and that pays out the currency before the coins are paid out.

The present invention enables the coins, that are paid out as change, to apply sizable propelling forces to the currency; and it does so by providing a long free-fall for the large size coins. In one preferred embodiment of the present invention, nickels, dimes and quarters are paid out; and the quarters are given a longer free-fall than are the nickels and dimes. Those quarters will thus have enough energy to make absolutely certain that the currency is propelled all the way into the cup-like receptacle. It is, therefore, an object of the present invention to provide a money-handling device that pays out both currency and coins as change and that provides a long free-fall for the large size coins paid out as change.

Coins which enter the cup-like receptacles of money-handling devices can sometimes bound out through the openings in the fronts of those receptacles; and this is objectionable. At the very least, the bounding of coins out through those openings can inconvenience the patrons; and that bounding can lead to the loss of change. The present invention obviates any bounding of coins out through the opening in the front of a cup-like receptacle by providing a normally-closed closure for that opening. It is, therefore, an object of the present invention to provide a normally-closed closure for the opening in the front of the cup-like receptacle of a money-handling device.

The cup-like receptacles of money-handling devices are, of necessity, accessible to patrons and to other persons. Some persons have been known to try to reach in through the cup-like receptacles of money-handling devices, either with their hands or with wires or with rods, to try to remove currency or coins from the storage tubes therefor. The present invention provides a cup-like receptacle for money-handling devices which makes any change therein readily accessible to patrons, but which keeps persons from inserting their hands or wires or rods through that cup-like receptacle and removing currency or coins from the storage tubes therefor. It is, therefore, an object of the present invention to provide a cup-like receptacle for money-handling devices which makes any change therein readily accessible to partons, but which keeps persons from inserting their hands or wires or rods through that cup-like receptacle and removing currency or coins from the storage tubes therefor.

The cup-like receptacle provided by the present invention has a closure that is normally in position to close the opening at the front of that cup-like receptacle, and has a blocking member that is normally held out of blocking position. As a result, currency and coins can normally pass freely by the blocking member and move toward the closure, and that closure will normally block the opening at the front of the cup-like receptacle. That closure can be moved away from that opening to give a patron access to the change in the cup-like receptacle; and as that closure is so moved it will move the blocking member into blocking position. At such time, that blocking member will keep any currency or coins from rolling rearwardly in the cup-like receptacle beyond the reach of the patron, and that blocking member will also keep persons from reaching through the cup-like receptacle and removing currency and coins from the storage tubes therefor. It is, therefore, an object of the present invention to provide a cup-like receptacle for money-handling devices with a closure that is normally in position to close the opening at the front of that cup-like receptacle and with a blocking member that is normally held out of blocking position but that moves to blocking position whenever said closure is moved to open position.

Other and further objects and advantages of the present invention should become apparent from an examination of the drawing and accompanying description.

In the drawing and accompanying description a preferred embodiment of the present invention is shown and described but it is to be understood that the drawing and accompanying description are for the purpose of illustration only and do not limit the invention and that the invention will be defined by the appended claims.

Figure 2:
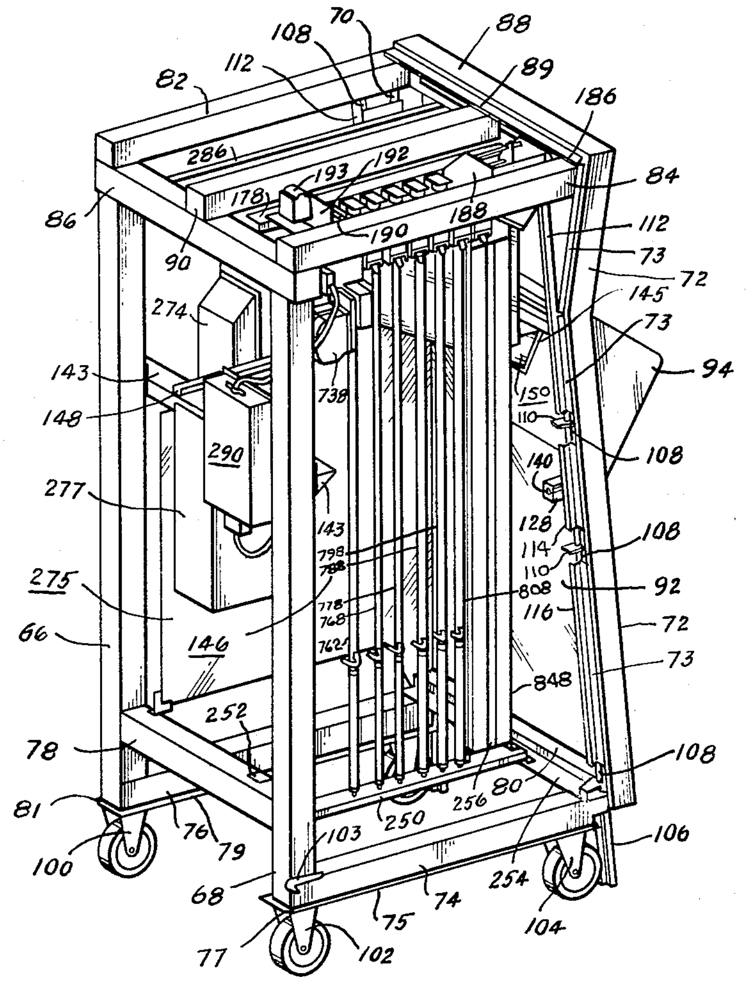
Figure 3:
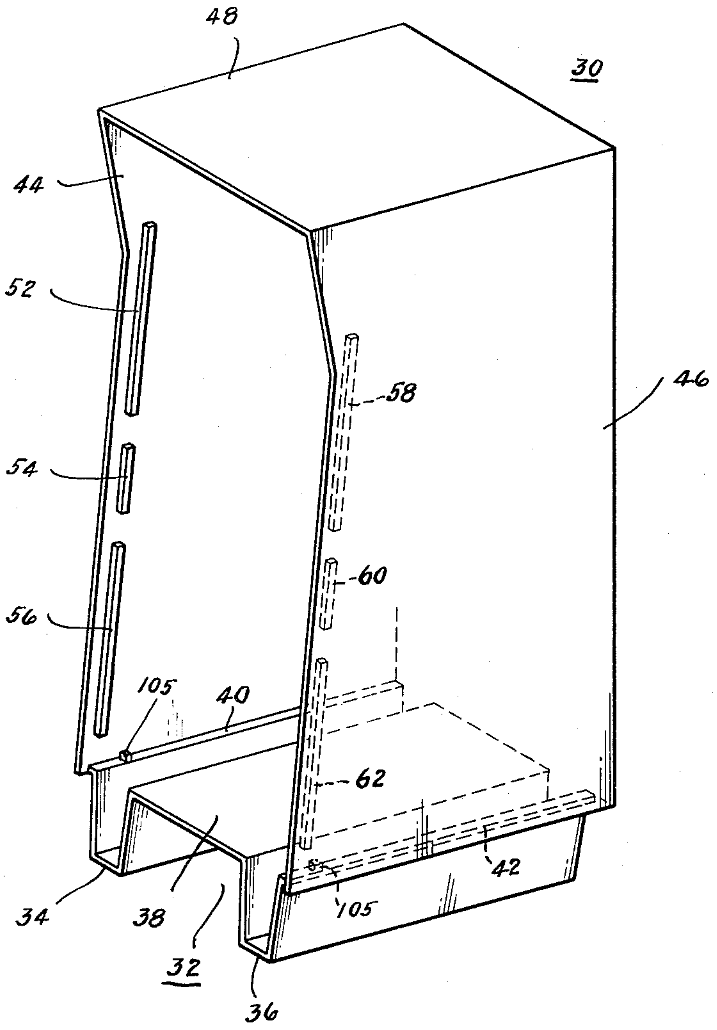
Figure 4:
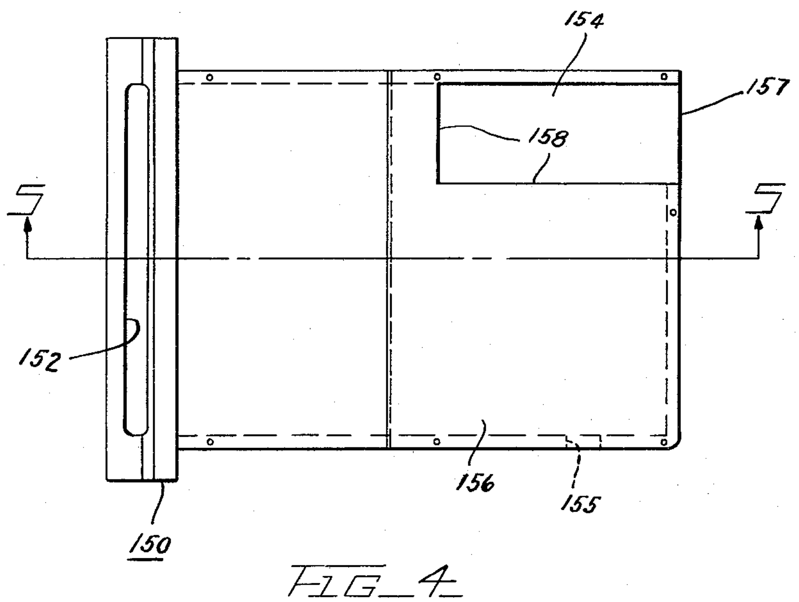
Figure 5:
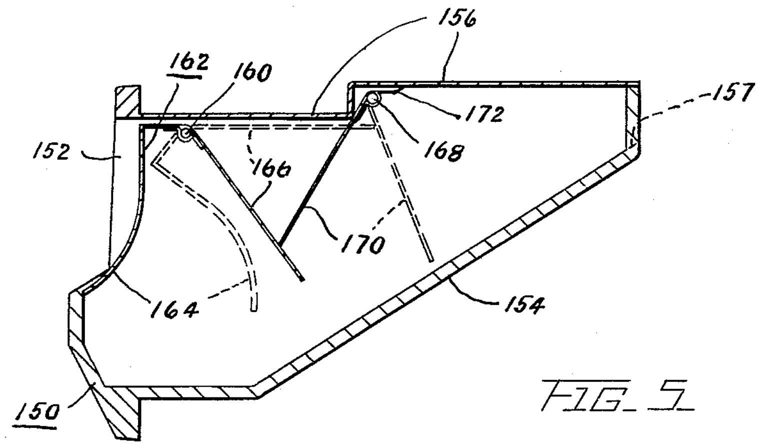
Figures 6, 7:
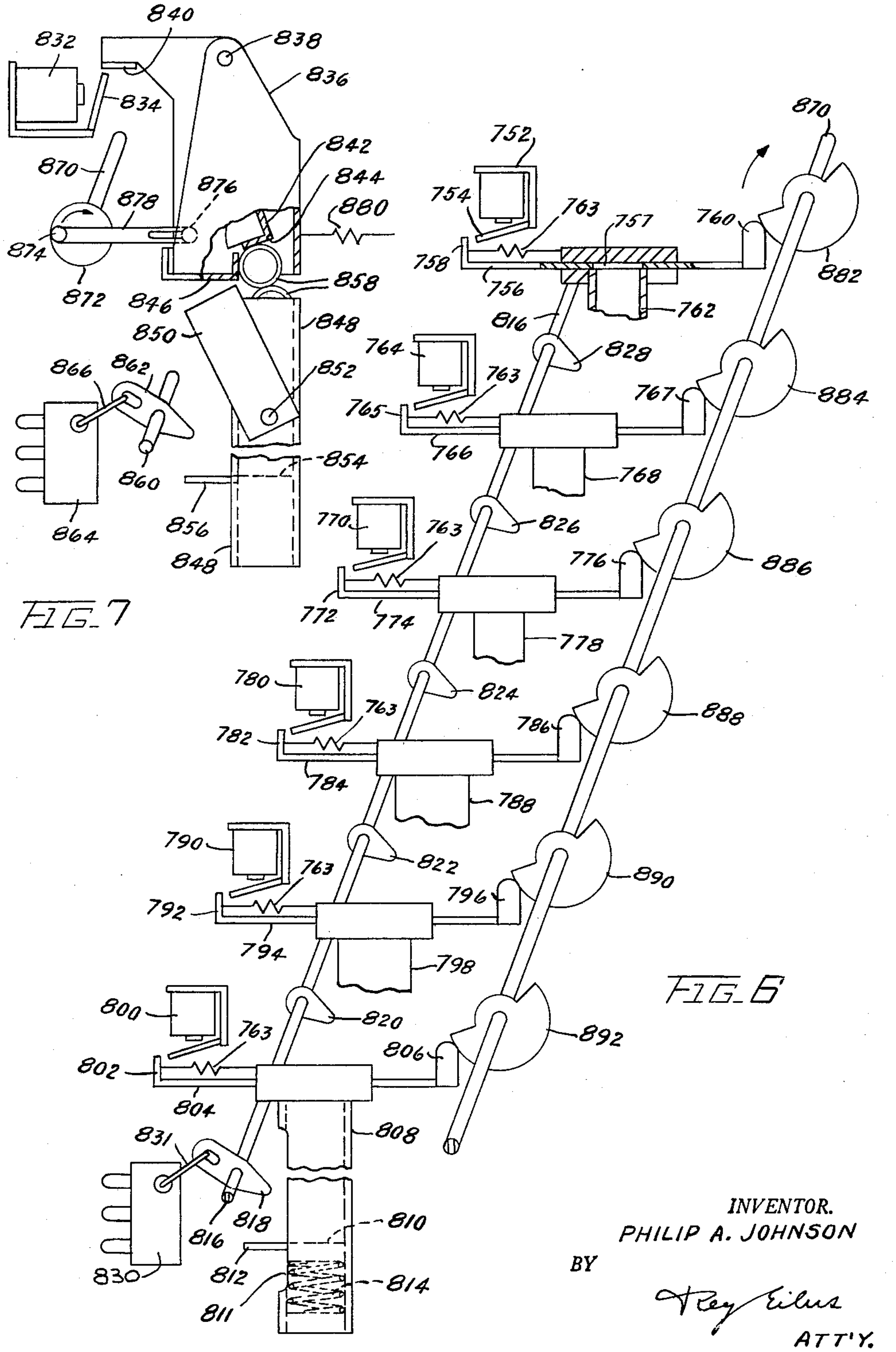
Figures 8, 9:
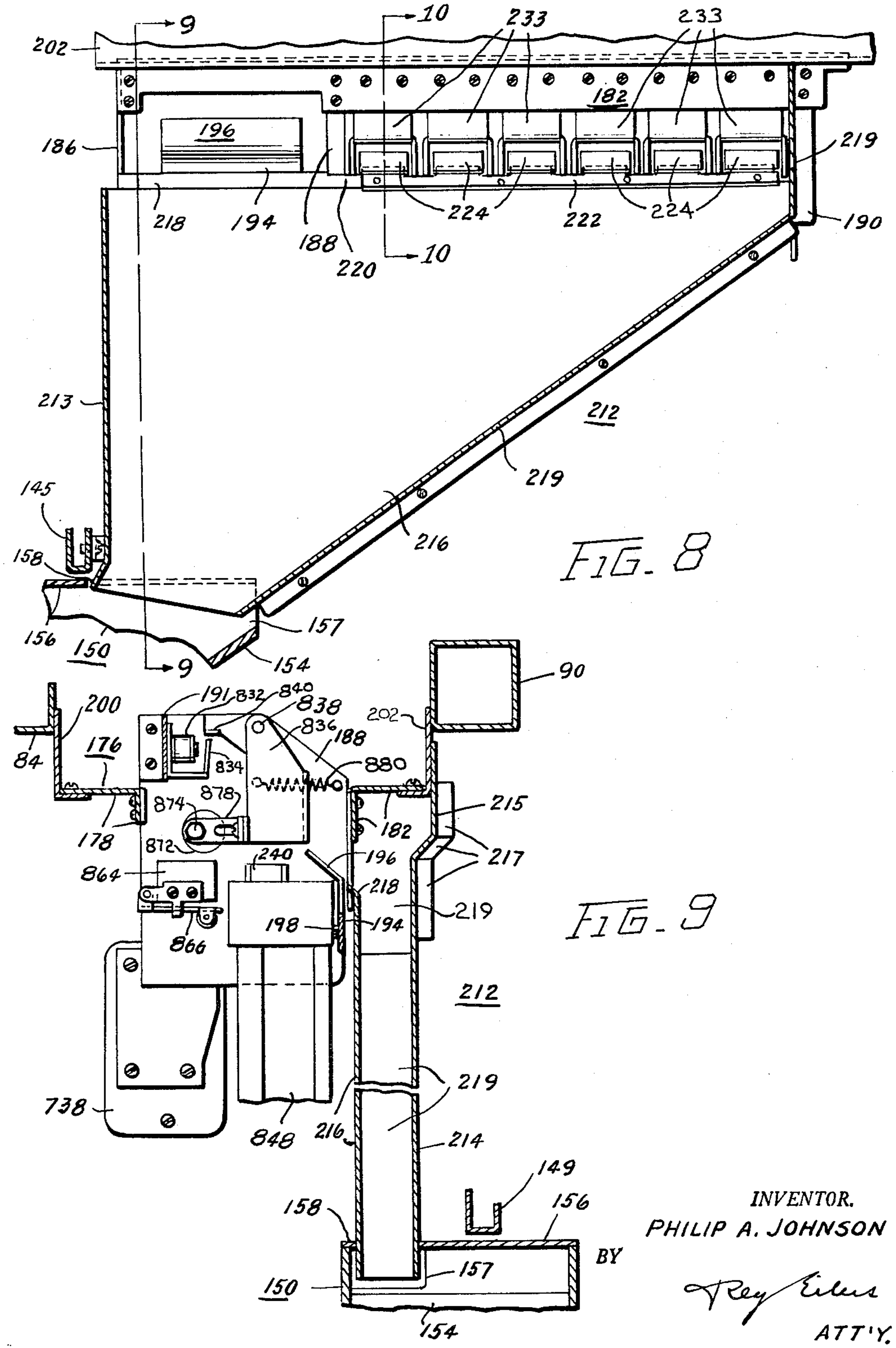
Figure 10:
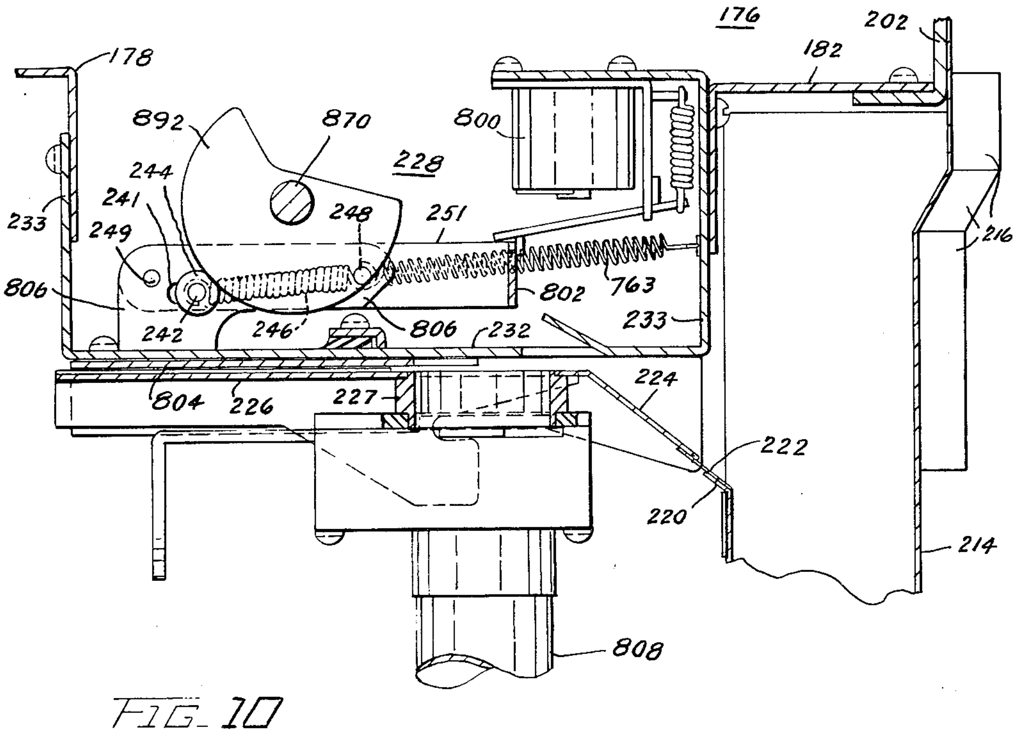

In the drawing,

FIG. 1 is a perspective view of one form of change-making device and of the supporting frame therefore, FIG. 2 is a perspective view of the change-making device and frame of FIG. 1 as that device and frame are viewed from the rear, FIG. 3 is a prespective view of the housing for the change-making device and frame of FIGS. 1 and 2, FIG. 4 is a plan view, on a greatly enlarged scale, of the cup-like receptacle for the change-making device of FIGS. 1 and 2, FIG. 5 is a sectional view, on the scale of FIG. 4, through the cup-like receptacle of FIG. 4, and it is taken along the plane indicated by the line 5—5 in FIG. 4, FIG. 6 is a perspective view, in schematic form, of the coin-ejecting assemblies of the change-making device of FIGS. 1 and 2, FIG. 7 is a perspective view, in schematic form, of the currency-ejecting assembly of the change-making device of FIGS. 1 and 2, FIG. 8 is a vertical section, on a large scale, through a chute for the change-making device of FIGS. 1 and 2, and it shows portions of the currency-ejecting and coin-ejecting assemblies of that change-making device, FIG. 9 is a sectional view through the chute of FIG. 8, and it is taken along the plane indicated by the line 9—9 in FIG. 8, and FIG. 10 is another sectional view through the chute of FIG. 8, it is on a larger scale, and it is taken along the plane indicated by the line 10—10 in FIG. 8.

Referring to the drawing in detail, the numeral 30 denotes a preferred embodiment of the housing that is provided by the present invention for money-handling devices; and that embodiment is shown in detail in FIG. 3. The housing 30 has a bottom which is generally denoted by the numeral 32, and that bottom has two generally U-shaped foot portions 34 and 36. The upper edges of the inner walls of those U-shaped foot portions are connected by a plane portion 38 of the bottom 32; and horizontally-directed flanges 40 and 42 extend outwardly from the upper edges of the outer walls of those U-shaped foot portions. The bottom 30 is preferably made by pressing it out of a large metal plate.

The numeral 44 denotes one of the side walls of the housing 30, and the other side wall of that housing is denoted by the numeral 46. A top 48 has the sides thereof suitably secured to the upper edges of the side walls 44 and 46; and a rear wall, not shown, is suitably secured to the rear edges of the bottom 32, of the side walls 44 and 46, and of the top 48. Seam welds will preferably be used to secure the side walls 44 and 46 to the flanges 40 and 42, to secure the upper edges of the side walls 44 and 46 to the top 48, and to secure the rear wall to the rear edges of the bottom 32, of the side walls 44 and 46, and of the top 48. The gauge of the metal used in the bottom 32, in the walls 44 and 46, in the top 48, and in the rear wall is heavy enough to keep persons from breaking through that metal. For ornamental reasons, the front edges of the walls 44 and 46 are formed to define obtuse dihedral angles.

Locking bars 52, 54, and 56 are secured to the inner face of the side wall 44, and locking bars 58, 60 and 62 are secured to the inner face of the side wall 46. Those locking bars are described in detail in the currently-filed application of William J. McCalley for Money-Handling Device.

The housing 30 accommodates the change-making device of FIGS. 1 and 2 and the frame therefor, and that frame includes an upright 66, an upright 68, an upright 70 and an upright 72. The uprights 70 and 72 are bent adjacent the upper ends thereof to have configurations which are complementary to the configurations of the front edges of the walls 46 and 44. As a result, the rear faces of the uprights 70 and 72 can intimately abut the front edges of the walls 44 and 46 of the housing 30.

The numeral 74 denotes a horizontally-directed spacer which is secured to and extends between the lower ends of the uprights 68 and 72; and that spacer fixedly holds the lower ends of those uprights rigidly spaced apart. A generally similar spacer 76 is secured to and extends between the lower ends of the uprights 66 and 70; and that spacer fixedly holds the lower ends of those uprights rigidly spaced apart. A horizontally-directed spacer 78 is secured to and extends between the lower ends of the uprights 66 and 68; and that spacer fixedly holds the lower ends of those uprights rigidly spaced apart. A generally similar spacer 80 is secured to and extends between the lower ends of the uprights 70 and 72; and that spacer fixedly holds the lower ends of those uprights rigidly spaced apart.

A horizontally-directed spacer 86 is secured to and extends between the upper ends of the uprights 66 and 68; and that spacer fixedly holds the upper ends of those uprights rigidly spaced apart. A generally similar spacer 88 is secured to and extends between the upper ends of the uprights 70 and 72, and that spacer fixedly holds the upper ends of those uprights rigidly spaced apart.

The numeral 82 denotes a horizontally-extending spacer which extends between and is secured to one end of the spacer 86 and to the upper end of the upright 70; and that spacer fixedly holds that one end of the spacer 86 and the upper end of the upright 70 in rigidly spaced relation. A spacer 84 extends between and is secured to the other end of the spacer 86 and to the upper end of the upright 72; and that spacer fixedly holds that other end of the spacer 86 and the upper end of the upright 72 in rigidly spaced relation. A further spacer 90 extends between and is secured to the spacer 86 and to the spacer 88.

The spacers 74, 76, 78, 80, 82, 84, 86, 88 and 90 coact with the uprights 66, 68, 70 and 72 to provide a sturdy and rugged frame for the change-making device of FIGS. 1 and 2. Those uprights and those spacers will be suitably secured together, as by welding.

Shallow recesses are formed in the lower portions of the front faces of the uprights 70 and 72, and those recesses accommodate a panel 92 of decorative nature and a protuberance 94 of generally triangular cross-section. A shallow recess is formed in the front face of the spacer 80, and that recess accommodates the lower edge of the panel 92. A deep recess is provided in the front face of the spacer 88, and recesses of progressive depth are provided in the front faces of the upper portions of the uprights 70 and 72, to accommodate an ornamental panel 96; and that panel is set at a slight angle to the plane defined by the upper portions of the uprights 72 and 70. The uprights 70 and 72, the spacers 80 and 88, panels 92 and 96, and the protuberance 94 are intended to constitute an ornamental and attractive removable front for the housing 30. The uprights 70 and 72 and the spacers 80 and 88 will preferably have the outer faces thereof overlain by thin sheets of an ornamental metal such as stainless steel.

Two openings 93 are formed in the panel 92 adjacent the upper end of that panel, but those openings are normally closed by locks 98. Those locks can, whenever desired, be bodily removed from those openings to provide full access to those openings.

The numeral 71 denotes a flange which is secured to the rear face of the upright 70, and that flange is set inwardly from the outer side of that upright, That flange extends rearwardly from the rear face of the upright 70 and extends inwardly of the plane defined by the outer side of that upright. Similarly, a flange 73 is secured to the rear face of the upright 72, and that flange is set inwardly from the outer side of that upright. That flange extends rearwardly from the rear face of the upright 72 and extends inwardly of the plane defined by the outer side of that upright. A flange 89 is secured to the rear face of the spacer 88, and that flange is set downwardly from the upper side of that spacer. That flange extends rearwardly from the rear face of that spacer, and extends downwardly from the plane defined by the upper side of that spacer.

The flanges 71, 73 and 89, respectively, underlie the joint between the upright 70 and the wall 46, the joint between the upright 72 and the wall 44, and the joint between the spacer 88 and the top 48. In doing so, those flanges keep persons from inserting knife blades or other thin objects through those joints.

The inclinations of the flanges 71 and 73 inwardly of the planes defined, respectively, by the uprights 70 and 72, and the inclination of the flange 89 downwardly of the plane defined by the upper face of the spacer 88 are desirable because they enable the frame for the money-handling device of FIGS. 1 and 2 to telescope within the housing 30 of FIG. 3 even if the walls 44 and 46 or the top 48 are bowed slightly inwardly. Specifically, if the wall 44 of the housing 30 is bowed slightly inwardly, the rearmost edge of the inwardly inclined flange 73 will telescope inwardly of the free edge of that wall, as the frame of the change-making device is being telescoped within the housing 30, and that flange will bend that free edge outwardly to its intended position as that frame moves wholly within that housing. Similarly, if the wall 46 and the top 48 are bowed slightly inwardly, the rearmost edges of the flanges 71 and 89 will telescope inwardly of the free edges of that wall and top and will bend those free edges outwardly to their intended positions as the frame of the money-handling device moves wholly within that housing.

A sturdy metal plate 75 is secured to the lower face of the spacer 74, and the outermost rear corner of that plate is cut-away to define an inclined face 77. A sturdy metal plate 79 is secured to the lower face of the spacer 76, and the outermost rear corner of that plate is cut-away to define an inclined face 81. Casters 100 and 101 are secured to and depend downwardly from the plate 79, and casters 102 and 104 are secured to and depend downwardly from the plate 75. The casters 100, 101, 102 and 104 rotatably support wheels; and those wheels are preferably equipped with rubber faces. The casters 100, 101, 102 and 104 are fixedly held against rotation, and hence they enable the wheels held thereby to define a substantially fixed path of movement for the frame of the money-handling device.

Cover plates 106, which are similar in configuration to the U-shaped foot portions 34 and 36, depend downwardly from the spacer 80. Those cover plates overlie the front casters 101 and 104 and the wheels held by those casters. The side edges of the cover plates 106 project outwardly beyond the side walls of the U-shaped foot portions 34 and 36 and complete the ornamental appearance of the removable front for the housing 30.

The wheels which are rotatably supported by the casters 100 and 101 will telescope into the U-shaped foot portion 36 of the frame 30; and the wheels which are rotatably supported by the casters 102 and 104 will telescope into the U-shaped foot portion 34 of that frame. The plate 79 is dimensioned so its outer face will be immediately adjacent the inner face of the outer wall of the U-shaped portion 36 whenever the change-making device and the frame therefor are telescoped into the housing 30. Similarly, the plate 75 is dimensioned so its outer face will be immediately adjacent the inner face of the outer wall of the U-shaped portion 34 of the housing 30 whenever the change-making device and the frame therefor are telescoped into that housing. This means that the plates 79 and 75 will be out of engagement with the inner faces of the outer walls of the U-shaped portions 36 and 34 whenever the frame of the change-making device is precisely centered in the housing 30, but will immediately engage those inner faces if that frame starts moving toward the side wall 44 or the side wall 46. In this way, the plates 75 and 79 coact with the U-shaped foot portions 34 and 36 to keep the frame precisely alined with the housing 30. The inclined faces 81 and 77, respectively, on the plates 79 and 75 serve as inclined planes; and they will coact with the outer walls of the U-shaped foot portions 36 and 34 to force the frame of the change-making device into precise alinement with the housing 30 as that frame is started into that housing.

Latches 103 are suitably pivoted to the frame of the change-making device adjacent the lower ends of the uprights 66 and 68. Downwardly-depending hooks are provided on those latches adjacent the rear ends of those latches; and those hooks can engage stops 105 which are mounted within the housing 30 adjacent the front edges of the flanges 40 and 42 on the bottom 32. The leading edges of the hooks on the latches 103 are inclined, and those edges will be raised upwardly by the stops 105 as the frame is telescoped into the housing 30. Once those hooks have passed rearwardly beyond the stops 107, those hooks will move downwardly and rest upon the flanges 40 and 42 of the bottom 32; and those hooks will then coact with those stops to limit outward movement of the frame for the change-making device. However, whenever it is desirable to completely separate the frame of the change-making device from the housing 30, it is a simple matter to raise the latches 103 far enough upwardly to enable the hooks on the rear ends of those latches to pass over the stops 105.

The numeral 108 denotes elongated, sturdy rods which have the upper ends thereof held by brackets that are secured to the spacers 82 and 84 and which have the lower ends thereof held by brackets that are secured to the spacers 76 and 74. Brackets 110 are secured to the rear faces of the uprights 70 and 72 and provide support for the rods 108 intermediate the upper and lower ends of those rods. Latches 112, 114 and 116 are fixedly secured to the rods 108; and those latches are shown and described in detail in the said McCalley application.

U-shaped brackets 128 are secured to the rear face of the panel 92 and to the inner sides of the uprights 70 and 72. Each of those brackets rotatably supports a threaded rod with a reduced diameter end 140; and those rods extend through recessed blocks held by the U-shaped brackets 128. The wide portions of the latches 114 extend into the recesses of those recessed blocks and can be moved by rotation of the threaded rods. The brackets 128, the threaded rods, and the recessed blocks held thereby are shown and described in detail in the said McCalley application. The brackets 128 are in register with those openings in the panel 92 which are normally closed by the locks 98.

The numeral 146 generally denotes the change-making device of FIGS. 1 and 2; and that change-making device can pay out both currency and coins. While different types of change-making devices could be used, the change-making device that is shown and described in the currently-filed application of Bernard S. Cahill and Daniel J. Schepflin for Money-Handling Devices is preferred. That change-making device can respond to the insertion of a five dollar bill to pay out nickels, dimes, quarters and four one dollar bills.

The change which is paid out by that change-making device can be retrieved by patrons by reaching into a cup-like receptacle which is denoted by the numeral 150 and which extends through an opening in the ornamental panel 92. That cup-like receptacle is shown in detail in FIGS. 4 and 5, and it has an opening 152 at the front thereof, has a downwardly and forwardly inclined rear bottom portion, and has an opening 155 in one of the sides thereof. The top of the cup-like receptacle 150 is substantially closed by a closure 156; and, as indicated particularly by FIG. 5, that closure has an upwardly-offset rear portion. As opening 158 is provided in that upwardly-offset rear portion, and the currency and coins which are to be paid out as change will enter that cup-like receptacle through that opening. The opening 158 is in register with the downwardly and forwardly inclined bottom portion 154 of the cup-like receptacle. Currency and coins entering the opening 158 will strike the inclined bottom portion 154 and be directed toward the front portion of the cup-like receptacle 150.

The opening 155 in the one side of the cup-like receptacle 150 will be suitably connected by a chute to the returned coin outlet of the slug rejector used with the change-making device. That slug rejector is denoted by the numeral 284 in FIG. 1; and any coins or slugs which are returned or rejected by that slug rejector will pass to the opening 155 in the one side of the cup-like receptacle 150. Those coins or slugs will then slide down the inclined bottom portion 154 toward the front of that cup-like receptacle.

The numeral 160 denotes a pivot which extends transversely of the cup-like receptacle 150, and that pivot is adjacent the top of that receptacle. A closure which is generally denoted by the numeral 162 is rotatably mounted on that pivot, and the concave front portion 164 of that closure extends forwardly and then downwardly from that pivot. The lower edge of the front portion 164 of the closure 162 is disposed below the lower edge of the opening 152 of the receptacle 150, as shown by FIG. 5. The closure 162 has a portion 166 that inclines downwardly and rearwardly from the pivot 160, as shown by FIG. 5. In cross-section, the closure 162 generally resembles an inverted V.

A second pivot 168 extends transversely of the cup-like receptacle 150, and that pivot also is adjacent the top of that receptacle. A blocking plate 170 is rotatably supported by that pivot, and a spring 172 biases the plate 170 for rotation in the clockwise direction. That spring normally holds the lower edge of the plate 170 against the rear portion 166 of the closure 162, and also normally urges the lower edge of the concave front portion 164 of the closure 162 against the bottom edge of the opening 152. This means that the opening 152 of the cup-like receptacle 150 is normally closed; and this is desirable because it will keep any change from bounding forwardly through the cup-like receptacle 150 and out through the opening 152. However, whenever a patron wants to recover any change due him, he need only urge his fingers against the concave front portion 164 of the closure 162; and thereupon the rearwardly-directed force which the rear portion 166 of that closure will apply to the blocking plate 170 will overcome the force applied to that plate by the spring 172. The overall result is that the blocking plate 170 will rotate in the counter clockwise direction and will permit the closure 162 to rotate in the counter clockwise direction. As that closure so rotates, it will provide full and ready access to the front portion of the cup-like receptacle 150. The rotated positions of the plate 170 and of the closure 162 are indicated by dotted lines in FIG. 5; and in its rotated position, the plate 170 will keep persons from inserting their hands, wires or rods through the cup-like receptacle 150 and removing currency and coins from the storage tubes therefor. Also, whenever the plate 170 is in its rotated position, it will keep currency and coins from rolling so far toward the rear of the cup-like receptacle as to be beyond the reach of a patron.

A channel 145 extends between the confronting faces of the uprights 70 and 72, and that channel extends above the cover plate 156 for the receptacle 150. An angle 143 is secured to the forward faces of the uprights 66 and 68 at about the same level as the channel 145. Channels 148 and 149 extend between and are secured to the channel 145 and to the angle 143; and that angle and those channels support components of the change-making device.

Referring particularly to FIG. 9, the numeral 200 denotes an angle which is secured to the inner face of the spacer 84. That angle depends downwardly below the level of the bottom face of that spacer, and the horizontal portion of that angle extends toward the spacer 90. An angle 202 is secured to that face of the spacer 90 which confronts the spacer 84; and that angle depends downwardly below the level of the bottom face of that spacer. The horizontal portion of the angle 202 extends toward the horizontal portion of the angle 200.

The numeral 176 generally denotes a frame which supports the coin-ejecting and currency-ejecting assemblies of the change-making device; and that frame includes an angle 178 and an angle 182. A vertically-directed plate 186 is secured to one end of each of the angles 178 and 182, and that plate fixedly holds those ends in spaced relation. A plate 188, which has generally the same configuration as the plate 186, is fixedly secured to the angles 178 and 182; and that plate is spaced from the plate 186 a distance equal to about one quarter of the length of the angle 178. A generally rectangular plate 190 is secured to the angles 178 and 182, and that plate is spaced from the opposite ends of those angles a distance equal to about one fifth of the length of the angle 178. An angle 192 is secured to the angles 178 and 182 adjacent the said opposite ends of those angles, and that angle coacts with the plate 190 to fixedly hold those opposite ends of those angles in spaced relation. The angle 192 supports a counter 193.

A plate 191 is secured to and extends between the plates 186 and 188; and a plate 194 also is secured to and extends between the plates 186 and 188. The plate 194 has an upwardly-extending lip 196 which is disposed at an angle to the rest of that plate 194. As indicated particularly by FIG. 9, the lip 196 inclines upwardly and to the left from the plane of the plate 194, and that lip inclines toward the plate 191. The plate 194 supports a pair of pins 198; and those pins have generally conical faces, not shown, and have annular recesses, not shown, adjacent those faces.

The numeral 212 generally denotes a chute of the change-making device, and that chute has a generally triangular wall 214. The upper portion of the wall 214 is offset, as at 215 in FIG. 9; and a flange 217 projects at a right angle from one end of the offset portion 215 and from the rest of that end of the wall 214. A generally similar flange, not shown, projects at a right angle from the other end of the offset portion 215 and from the rest of the other end of the wall 214. The lower end of the wall 214 extends down into the opening 158 in the closure 156 for the cup-like receptacle 150, as shown particularly by FIGS. 8 and 9. A second wall 216, of similar triangular configuration, is provided for the chute 212; and an end wall 213 and an inclined bottom 219 coact to hold the walls 214 and 216 in rigidly spaced relation. The upper end of the inclined bottom is vertical, as indicated by FIG. 8, and it closes the right-hand end of the chute 212.

An upwardly-extending lip 218 is provided on the wall 216, and that lip extends upwardly and to the left from the plane of that wall; as that lip and wall are viewed in FIG. 9. The lip 218 has a tall portion which is generally in register with the lip 196 on the plate 194, and it has a short portion 220 which extends from that tall portion to the right hand end of the wall 216. A notched plate 222 is suitably secured to the inner face of the short portion 220; and the portions of that plate which define the notches therein project upwardly beyond the upper edge of the short portion 220.

The portions of the plate 222 which define the notches in that plate extend upwardly to underlie and abut the forwardly and downwardly inclined front edges 224 of the bottom plates 226 of the coin-ejecting assemblies 228 which are parts of the change-making device. Each of those coin-ejecting assemblies has a horizontally-disposed supporting plate 232; and each of those supporting plates has two elongated slots therein and has upwardly-extending ears 233 at the opposite ends thereof. The ears 233 which overlie the forwardly and downwardly inclined edges 224 are secured to the angle 182 of the frame 176; and those ears will be bent to extend horizontally to the left, as shown by FIG. 10. The horizontal portions of those ears will support the electromagnets 752, 764, 770, 780, 790 and 800 shown in FIG. 6. The upwardly-extending ears 233 at the other ends of the supporting plates 232 are secured to the angle 178. As indicated particularly by FIG. 10, the supporting plates 232 and the bottom plates 226 confine between them the coin-ejecting slides 756, 766, 774, 784, 794 and 804 shown in FIG. 6. Each of those slides has two ears which extend upwardly through the elongated slots in the adjacent supporting plates 232, and those ears then extend horizontally above and parallel to those supporting plates. Those ears have slots 241 which accommodate pivots 242; and rollers 244 are rotatably mounted on those pivots. Helical extension springs 246 extend between pins 248 and the pivots 242 to urge those pivots toward the right-hand ends of those slots. The pins 248 coact with fasteners 249 to secure the arms of U-shaped brackets 251 to the said ears of the various slides. The closed ends of those U-shaped brackets are adjacent the free ends of the armatures of the electromagnets 752, 764, 770, 780, 790 and 800 in FIG. 6. As indicated by FIG. 10, those free ends have downwardly-directed ears that normally lie in the paths of the closed ends of the U-shaped brackets 251. Springs 763 extend between the pins 248 and the ears 233; and those springs bias the slides toward coin-ejecting position. The bottom plates 226 have rings 227 secured to them, and those rings can have the coin storage tubes 762, 768, 778, 788, 798 and 808 releasably secured to them.

The coin-ejecting slide 804, the spring 763, one of the ears 806, the electromagnet 800, and the armature for that electromagnet are shown in detail in FIG. 10, but that slide, spring, ear, electromagnet and armature are shown only schematically in FIG. 6. Similarly, the other slides, springs, ears, electromagnets and armatures of the coin-ejecting assemblies are shown only schematically in FIG. 6. The closed ends of the U-shaped brackets 251 are, for clarity of showing, shown as ears 758, 765, 772, 782, 792 and 802 in FIG. 6. The cams 882, 884, 886, 888, 890 and 892 actually engage the rollers 244 held by the ears 760, 767, 776, 786, 796 and 806; but, for clarity of showing, those cams are shown, in FIG. 6, as directly engaging those ears. In addition, while the coin-ejecting slides actually have semi-circular recesses at the ends thereof so as to accommodate the coins which are pressed upwardly against the lower faces of the supporting plates 232, those slides have, for clarity of showing, been shown in FIG. 6 as having coin-receiving openings 757 therein.

Further details of the coin-ejecting assemblies are shown and described in Erickson et al. application Serial No. 35,504 for Coin Separators which was filed on June 13, 1960. In addition, full details of the structure for, and the manner of, releasably securing the coin storage tubes to the rings 227 are shown and described in that application.

In the particular embodiment of change-making device shown and described herein, there are six coin-ejecting assemblies 228. One of those coin-ejecting assemblies has a coin storage tube 762 which accommodates the nickels, has an ejector 756 with a coin-receiving opening 757, with an ear 760 at the forward end thereof and with an ear 758 adjacent the rear end thereof, has a spring 763 that normally holds the ear 760 adjacent a cam 882, and has the ear 758 in register with the armature 754 of an electromagnet 752.

Two coin-ejecting assemblies are provided to dispense dimes; and those coin-ejecting assemblies have coin storage tubes 768 and 778 and have coin-ejecting slides 766 and 774. The slide 766 has an ear 767 that normally abuts a cam 884, and it has an ear 765 which normally has the armature of an electromagnet 764 in its path. The slide 774 has an ear 776 which normally abuts the cam 886 and the armature of the electromagnet 770 is normally in the path of the ear 772. Springs 763 bias the slides 766 and 774, respectively, toward the cams 884 and 886.

Three coin-ejecting assemblies are provided to eject quarters; and those coin-ejecting assemblies have coin-storage tubes 788, 798, and 808 and have coin-ejecting slides 784, 794 and 804. The ears 786, 796 and 806, respectively, on those slides are urged toward the cams 888, 890 and 892 by the springs 763. The armatures of the electromagnets 780, 790 and 800, respectively, normally lie in the paths of the ears 782, 792 and 802 of those slides.

Each of the coin storage tubes 762, 768, 778, 788, 798 and 808 has a coin-supporting platform 810 therein, and each of those platforms is provided with an ear 812 that projects outwardly through a slot 811 in the coin tube. A shaft 816 is mounted adjacent the various coin-storage tubes, and that shaft has arms 818, 820, 822, 824, 826 and 828 mounted thereon; and those arms are in register with the ears 812 of the coin-supporting platforms 810 of the various coin-storage tubes. A switch 830, is mounted adjacent the arm 818, and the actuator 831 of that switch extends into a slot in the upper end of that arm. Whenever the supply of coins in any of the coin-storage tubes 762, 768, 778, 788, 798 and 808 becomes depleted, the ear 812 on the coin-supporting platform 810 of that tube will rise upwardly and engage the appropriate arm on the shaft 816, thereby causing the movable contact of the switch 830 to shift into its fully-moved position.

The currency-storage tube which is releasably mounted adjacent the chute 212 is shown in FIGS. 7 and 9; and that tube is denoted by the numeral 848. A currency-supporting platform 854 is disposed within that tube and an ear 856 of that platform extends through a vertically-directed slot in the wall of that tube. A Negator spring 240, which is shown in part in FIG. 9, urges that currency-supporting platform upwardly in the tube 848, but that spring permits that platform to be moved downwardly. A closure 850 is pivotably secured to the tube 848 by pivots 852; and the closed end of that closure is normally disposed rearwardly of the open upper end of the tube 848.

The plates 186 and 188 support a pivot 838, and that pivot rotatably supports a U-shaped member 836, as shown particularly by FIG. 7. A plate 842 which has a rearwardly-directed flange 844 at the bottom thereof is mounted within the U-shaped member 836, and that U-shaped member 836 has a closure 846. The flange 844, the forward face of the closure 846 and the closed front of the U-shaped member 836 coact to define a space which is normally in register with the upper end of the currency-storage tube 848 and which normally accommodates a currency-dispensing tube 858. In the particular embodiment of change-making device shown, each currency-dispensing tube 858 can accommodate two tightly-rolled two dollar bills or four tightly-rolled one dollar bills. A spring 880 urges the U-shaped member for rotation in the counter-clockwise direction in FIG. 7; but a slotted connecting rod 878, which is secured to a crank 872 by a pin 874 and which is secured to the U-shaped member 836 by a pin 876, normally prevents such rotation.

The crank 872 and the cams 882, 884, 886, 888, 890 and 892 are fixedly secured to a shaft 870 and rotate as a unit. As indicated particularly by FIGS. 6 and 7, the high dwells on the cams 882, 884, 886, 888, 890 and 892 will hold the ears 760, 767, 776, 786, 796 and 806 against movement to the right for more than one hundred and eighty degrees of rotation of the shaft 870. However, the crank 872 and the pin 874 will move the connecting rod 878 all the way to the right in FIG. 7 before the shaft 870 has rotated one hundred and eighty degrees. This is important because it means that if a currency dispensing tube 858 is to be ejected, it will be ejected before any of the coins which are to be paid out as change are ejected. As a result, the coins which are ejected as change will be able to help propel any currency-dispensing tube 858 downwardly through the chute 212 and downwardly along the inclined bottom portion 154 of the cup-like receptacle 150 in the event that coin dispensing tube tends to stop short of the forward portion of that cup-like receptacle.

An electromagnet 832 is mounted on the plate 191 adjacent the U-shaped member 836, and the armature 834 of that electromagnet normally underlies the ear 840 on that U-shaped member. As long as the armature 834 is in the path of the ear 840, rotation of the crank 872 by the shaft 870 will merely cause the slot in the connecting rod 878 to move relative to the pin 876 on the U-shaped member 836; because that armature will prevent appreciable rotation of the U-shaped member 836. However, when the electromagnet 832 is energized and the shaft 870 is rotated, the U-shaped member 836 will rotate and eject a currency-dispensing tube 858.

The motor which drives the shaft 870 is shown in FIG. 2 and is denoted by the numeral 738. A connector plug is mounted adjacent that motor and will carry the current to the various electromagnets, to the counter 193, and to that motor. The bottoms of the coin storage tubes 762, 768, 778, 788, 798 and 808 are supported on a channel 250 which has one end thereof resting upon an angle 254, that is secured to the spacer 80, and which has the other end secured to the spacer 78 by an upwardly-bent portion of the web thereof. The currency-storage tube 848 has the lower end thereof supported by a U-shaped bracket 256 which is secured to and supported by the channel 250. A small securing bracket 252 helps secure the one end of the channel 250 to the angle 254.

It will be noted, from FIG. 8, that the currency-ejecting assembly is in register with the opening 158 in the closure 156 of the cup-like receptacle 150. Further, it will be noted that the currency-ejecting assembly is spaced a sizable distance above that opening—in one embodiment of the change-making device the currency-ejecting assembly is spaced almost a foot above that opening. As a result, a currency dispensing tube 858 which is ejected by the U-shaped member 836 will have a long, straight free-fall and will then enter the opening 158 and should pass forwardly to the front portion of the cup-like receptacle 150.

It will also be noted that the three coin-ejecting assemblies which eject quarters are immediately adjacent the currency-ejecting assembly. This means that the quarters will have long free-falls and will thus have considerable kinetic energy as they strike the inclined bottom 219 of the chute 212. That energy will help those quarters apply sizable propelling forces to any currency dispensing tube 858 which has not moved all the way to the front portion of the cup-like receptacle 150.

In using the change-making device provided by the present invention, it is desirable to replenish the supply of change at least once a day. To replenish that supply of change, it is only necessary to move the change-making device and the frame part way out of the housing 30 and then separate the coin storage tubes 762, 768, 778, 788, 798 and 808 from the bottom plates 226 and the rings 277 of the various coin-ejecting assemblies and separate the currency storage tube 848 from the curreency-ejecting assembly. As pointed out in the said Erickson et al. application, it is a simple and easy matter to separate those coin storage tubes and that currency-storage tube, respectively, from the coin-ejecting assemblies and the currency-ejecting assembly. As those tubes are separated, they will automatically prevent the escape of coins and currency therefrom.

To move the change-making device and the frame therefor part way out of the housing 30, the service man will remove the locks 98 which are normally held in the openings in the front panel 92 and will insert a wrench through those openings to manipulate the latches 112, 114 and 116. After those latches have been rotated far enough to clear the locking bars 52, 54, 56, 58, 60 and 62, the service man will grasp the uprights 70 and 72 and exert an outwardly-directed pull on those uprights. Thereupon, the supporting frame for the change-making device will roll outwardly on the wheels supported by the casters 100, 101, 102 and 104. The wheels supported by the casters 101 and 104 will roll outwardly beyond the front edges of the U-shaped foot portions 36 and 34, but the wheels which are supported by the casters 100 and 102 will be kept from rolling out of the U-shaped foot portions 36 and 34 by the engagement of the latches 103 with the stops 105. As the frame of the change-making device moves outwardly, it will be confined to a closely fixed path of movement by the close spacing between the plates 75 and 79, respectively, with the inner faces of the outer walls of the U-shaped foot portions 34 and 36. In this way, the frame of the change-making device is held in precise registry with the housing 30; and hence that frame can readily be telescoped back into that housing at the conclusion of the change-replenishing operation.

If it becomes desirable to completely separate the frame of the change-making device from the housing 30, it is only necessary to raise the latches 103 out of register with the stops 105 at the interior of the housing 30 and then roll that frame away from that housing. Subsequent precise realinement of the frame of the change-making device with the housing 30 is facilitated by the inclined faces 77 and 81, respectively, on the plates 75 and 79. As indicated previously herein, those inclined faces serve as inclined planes and can engage the outer walls of the U-shaped foot portions 34 and 36 of the frame 30 to force the frame of the change-making device into precise registry with the housing 30. In this way, full registry of the frame of the change-making device with the housing 30 is assured even though that frame has been wholly separated from that housing.

After the supply of change has been replenished, and after the change-making device and its frame have been telescoped back into the housing 30, the money-handling device is in condition to be operated. To obtain change for a coin, the patron need only insert the coin through the coin inlet slot 270 provided in the panel 96. If that coin is a quarter, the electromagnets 752, 764 and 770 will be energized when the motor 738 is energized; and hence the slides 756, 766 and 774 will be able to eject one nickel and two dimes during the ensuing revolution of the shaft 870. If a fifty-cent piece is inserted, the electromagnet 780 will be energized in addition to the electromagnets 752, 764 and 770 when the motor 738 is energized; and hence during the ensuing revolution of the shaft 870, one nickel, two dimes and one quarter will be paid out.

To secure change for a one dollar bill, the patron will place the one dollar bill on the platform 336 which is exposed at the upper face of the triangular protuberance 94 in FIG. 1. Thereafter, the patron need only press the push button 340 which is exposed at the upper face of that protuberance 94. The currency-identifying unit of the change-making device will test the inserted bill; and if the bill is authentic, the electromagnets 752, 764, 770, 780, 790 and 800 will all be energized at the time the motor 738 is energized. This means that all of the coin-ejecting slides will be actuated during the revolution of the shaft 870; and hence one nickel, two dimes and three quarters will be paid out.

In the event a five dollar bill is to be changed, that bill will be placed on the platform 336 and the pushbutton 340 will be pressed. Thereupon the currency identifying unit of the change-making device will test that bill; and if that bill is authentic, the electromagnet 832 will be energized in addition to the electromagnets for all of the coin-ejecting assemblies 228. During the subsequent revolution of the shaft 870 a currency-dispensing tube 858 will be ejected, and then subsequently a nickel, two dimes and three quarters will be ejected. The currency-dispensing tube 858 will be guided into the chute 212 by the inclined lip 196 and by the inclined lip 218; and that currency dispensing tube should then fall downwardly through the opening 158 in the closure 156 of the cup-like receptacle 150 and move forwardly along the bottom of that receptacle. In the event that currency dispensing tube tends to delay its movement toward the forward end of the cup-like receptacle 150 or tends to stick before reaching that forward end, the nickel, the dimes and the quarters will apply propelling forces to that tube and force it to move to the forward end of that cup-like receptacle. The quarters will have the greatest amounts of kinetic energy, and they will make certain that the currency dispensing tube 858 is forced to move to the front end of the cup-like receptacle 150.

Thereupon, the patron can engage the arcuate front portion 164 of the closure 162 for that receptacle with his fingers, and those fingers will cause that closure to rotate in the counter-clockwise direction in FIG. 5. As previously explained, such rotation will force the plate 170 to move from its solid-line position to its dotted-line position and will cause the closure 162 to move from its solid-line position to its dotted-line position. When that closure and that plate are in their dotted-line positions, full access will be provided to the front portion of the cup-like receptacle 150, but a person will be kept from reaching upwardly past the plate 170 to try to effect the dispensing of further coins or currency from the storage tubes therefor.

Whereas the drawing and accompanying description have shown and described a preferred embodiment of the present invention it should be apparent to those skilled in the art that various changes may be made in the form of the invention without affecting the scope thereof.

What I claim is:

1. In a device that can pay out currency and coins, a receptacle means for paid-out currency and coins that holds and confines currency and coins introduced into it, a currency-ejecting means, a coin-ejecting means, and a chute means that extends between the outlets of said currency-ejecting means and said coin-ejecting means and that extends to said receptacle means, said currency-ejecting means being spaced above the level of, and generally in registry with, said receptacle means, said chute means providing a free-fall for said currency to enable said currency to have appreciable kinetic energy as it approaches said means.

2. In a device than can pay out currency and coins, a receptacle means for paid-out currency and coins that holds and confines currency and coins introduced into it, a currency-ejecting means, a coin-ejecting means, and a chute means that extends between the outlets of said currency-ejecting means and coin-ejecting means and that extends to said receptacle means, said currency-ejecting means ejecting its currency before said coin-ejecting means ejects its coin, whereby said coin can apply propelling forces to said currency if said currency fails to move all the way to said receptacle means.

3. In a device that can pay out currency and coins, a receptacle means for paid-out currency and coins that holds and confines currency and coins introduced into it, a currency-ejecting means, a coin-ejecting means, and a chute means that extends between the outlets of said currency-ejecting means and coin-ejecting means and that extends to said receptacle means, said currency-ejecting means ejecting its currency before said coin-ejecting means ejects its coin, whereby said coin can apply propelling forces to said currency if said currency fails to move all the way to said receptacle means, said coin-ejecting means being spaced above the level of said receptacle means and said chute means providing a free-fall for said coin to enable said coin to have appreciable kinetic energy as it engages said currency if said currency fails to move all the way to said receptacle means.

4. In a device that can pay out currency and coins, a receptacle means for paid-out currency and coins that holds and confines currency and coins introduced into it, a currency-ejecting means, a coin-ejecting means, and a chute means that extends between the outlets of said currency-ejecting means and said coin-ejecting means and that extends to said receptacle means, said currency-ejecting means being spaced above the level of said receptacle means and being substantially in registry with the inlet for said receptacle means, whereby the currency ejected by said currency-ejecting means need only fall substantially vertically to enter said receptacle means.

References Cited by the Examiner

UNITED STATES PATENTS

| | | | |
|---|---|---|---|
| 1,063,589 | 6/13 | Potter | 133—2 |
| 1,146,738 | 7/15 | Shannon | 312—317 |
| 1,222,659 | 4/17 | Niemann | 133—4 |
| 1,272,224 | 7/18 | Combs | 133—2 |
| 1,281,923 | 10/18 | Fales | 312—317 |
| 1,850,313 | 3/32 | Brandt | 133—4 |
| 1,984,997 | 12/34 | Smith | 312—35 |
| 2,089,709 | 8/37 | Rabkin | 312—35 |
| 2,211,308 | 8/40 | Wyman | 312—317 |
| 2,941,644 | 6/60 | Zeigle | 133—4 |
| 2,975,789 | 3/61 | Schmidt | 133—2 |

EVERETT W. KIRBY, *Primary Examiner.*

SAMUEL F. COLEMAN, *Examiner.*